Patented May 1, 1951

2,551,444

UNITED STATES PATENT OFFICE 2,551,444

PREPARATION OF STEROID ALCOHOLS FROM STEROID ALDEHYDES

Robert H. Levin, A. Vern McIntosh, Jr., and George B. Spero, Kalamazoo, Mich., assignors to The Upjohn Company, Kalamazoo, Mich., a corporation of Michigan No Drawing. Application October 2, 1947, Serial No. 777,578

9 Claims. (Cl. 260—397.5)

The present invention relates to steroid primary alcohols and to a method for the production thereof. The invention is more specifically concerned with certain steroid alcohols of the formula:

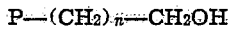

wherein P represents a pregnane nucleus attached to the side-chain at the 20 position, and $n$ is selected from zero, one, and two, and with a method for the preparation thereof from steroid aldehydes of the formula:

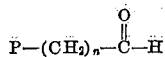

wherein P and $n$ have the values given for the desired alcohol.

It is an object of the present invention to provide novel primary steroid alcohols containing the pregnane nucleus and having a side-chain at the 20 position. These novel alcohols, containing acyloxy groups in the pregnane nucleus, have been unobtainable previously, as previous methods of alcohol preparation have involved the concomitant saponification and hydrolysis of the nuclear acyloxy groups. A further object of the invention is the provision of a process for the production of the said alcohols from steroid aldehydes having a side-chain containing the same number of carbon atoms. Other objects of the invention will become apparent hereinafter.

Members of the new group of compounds have been prepared, isolated, and found to be valuable intermediates in the preparation of more complex organic molecules, including certain hormones.

Among the steroid aldehydes which may be employed as suitable starting materials for the preparation of the steroid alcohols are cholanals, cholenals, lithocholals, desoxycholals, cholals, tetrahydroxy cholals, and similar steroid side-chain aldehydes having the C-20 side-chain previously given. Likewise, other aldehydes of unsaturated steroids, such as 3-hydroxy-(delta 5)-cholenic, 3,11-dihydroxy-(delta 5)-cholenic, and 3-hydroxy-(delta 5,7)-choladienic aldehydes, are suitable starting materials.

Other suitable aldehydes are those having one less side-chain carbon atom, i. e., the nor-cholanals and related compounds having substituents as given above in the cholenic series. The bisnor-cholanals have two less carbon atoms in the side-chain, and these compounds are also suitable starting materials.

Aldehydes having the designated side-chains and additional substituents in the nucleus, such as hydroxyl groups, esters and ether derivatives of hydroxyl groups, double bonds, protected double bonds, e. g., as by conversion to the dihalide or hydrohalide, and halogen atoms may also be used as starting materials. Some compounds having the mentioned substituents have been indicated for the first series, but any compound having the prescribed pregnane nucleus and the specified C-20

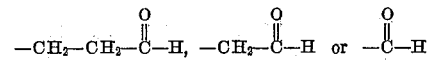

side-chain, regardless of other nuclear substituents, may be employed. For example, 3,11-dihydroxy-bisnor-cholenal, 3-chloro-(delta 5)-cholenal, 3-acetoxy-(delta 5)-cholenal, 3-methoxy-(delta 5)-nor-cholanal, 3,12-diethoxy-norcholanal, and 3-acetoxy-(delta 5)-bisnor-cholenal are entirely satisfactory starting materials.

A selected steroid acid may be converted to the corresponding thioester by either of two procedures, both of which proceed through the acid chloride. The first (A) involves reaction of the acid halide e. g., bromide or chloride, with a mercaptan in pyridine, and the second (B) involves reaction of the acid chloride with a suspension of lead mercaptide in ether according to the following sequence, as illustrated for an unsubstituted acid:

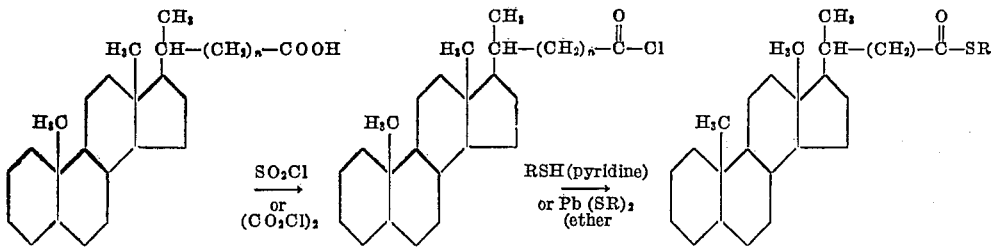

wherein $n$ is zero, one, or two; and R is an alcohol residue, preferably a hydrocarbon radical. Both of the given procedures have proven suitable.

Choice of the R radical in the starting thioester is purely arbitrary, the availability of the mercaptan or lead mercaptide being the only limiting factor. R may thus be alkyl, e. g., methyl, ethyl, propyl, isopropyl, butyl, isobutyl, amyl, n-octyl, or the like; cycloalkyl, e. g., cyclopentyl, cyclohexyl; cycloalkylalkyl, e. g., cyclohexylmethyl; aryl, e. g., phenyl, naphthyl; or aralkyl, e. g., benzyl or phenethyl. Unsaturated aliphatics and cycloaliphatics may also be employed, as well as compounds wherein R is chloroethyl, nitrophenyl, aminopropyl, bromonaphthyl and the like, provided the required starting material is available.

*Procedure A.—Mercaptan in pyridine*

The acid chloride, usually in an organic solvent, such as anhydrous benzene, is admixed with a selected mercaptan in a pyridine solution. Equimolar proportions are satisfactory, but an excess of mercaptan may sometimes be employed to advantage. Gentle heating sometimes increases reaction rate, but is not usually necessary, as the reaction occurs readily at room temperature. The reaction product may be worked up with water and ether, aqueous portions extracted and the combined ether layer washed with water, dilute alkali, dilute acid, and again with water. After drying the neutral fraction and evaporating solvent, the residual oil may be crystallized from a suitable solvent, e. g., alcohol, to yield the desired thioester, usually a stable solid.

*Procedure B.—Lead mercaptide in ether*

The acid chloride in anhydrous ether is added to a mixture of ether and selected lead mercaptide, or vice versa. Equimolar proportions are satisfactory; other ratios may be used if desired. The reaction mixture is allowed to stand with occasional swirling, gentle heating if desired. The reaction product may be worked up as in Procedure A.

The following examples are given to illustrate the preparation of a suitable starting thioester, but are in no way to be construed as limiting.

*Example 1.—Benzyl 3-alpha, 12-alpha-diacetoxy-nor-thiocholanate*

To 1.5 grams (0.0033 mole) of 3-alpha,12-alpha - diacetoxy-nor-cholanic acid was added 6 milliliters (9.8 grams, 0.082 mole) of purified thionyl chloride (Fieser, Experiments in Organic Chemistry, Part II, Heath and Co., New York, 1941, p. 381). The acid dissolved within five minutes and the solution was allowed to stand, with occasional swirling, at room temperature for one hour. Twenty milliliters of a 1:1 mixture of anhydrous benzene and ether was then added and the whole evaporated to dryness in vacuo at 40 degrees centigrade. This process of treatment with benzene-ether was repeated twice to ensure complete removal of excess thionyl chloride.

To the resulting acid chloride dissolved in 10 milliliters of anhydrous benzene was added 0.4 milliliter (0.005 mole) of dry pyridine and 2 milliliters (1.12 grams, 0.009 mole) of benzyl mercaptan, a precipitate soon forming. After standing for twenty-four hours at room temperature, the mixture was diluted with 15 milliliters of water and 15 milliliters of ether, whereafter the precipitate dissolved and the ether-benzene phase was separated. The organic portion was extracted with two 15-milliliter portions of water, one per cent sodium hydroxide, one per cent hydrochloric acid, and finally again with water. The neutral fraction was dried over anhydrous sodium sulfate, the solvent evaporated to dryness in vacuo, and the residual oil crystallized from 50 milliliters of 95 per cent alcohol to give 1.38 grams (73 per cent) of product, M. P. 147–152 degrees centigrade. After three recrystallizations from alcohol, 1.23 grams (65.5 per cent) of the benzyl thioester with a constant melting point of 154–156 degrees centigrade (corr.) was obtained.

*Example 2.—Ethyl 3-alpha, 12-alpha-diformoxy-thiocholanate*

The acid chloride (prepared from 4.5 grams (0.01 mole) of 3-alpha, 12-alpha-diformoxydesoxycholic acid in the manner described in Example 1) was dissolved in 30 milliliters of anhydrous ether and added to 1.8 grams (0.0055 mole) of lead ethyl mercaptide covered with 20 milliliters of anhydrous ether. The mixture was allowed to stand at room temperature with occasional swirling, the yellow lead mercaptide being gradually replaced by white lead chloride. After twenty-four hours, the solution was filtered and the precipitate washed with 50 milliliters of ether. The combined ether filtrate was washed with 100 milliliters of one per cent sodium hydroxide and 300 milliliters of water, then dried over anhydrous sodium sulfate and evaporated to dryness in vacuo on the steam bath. The residual oil was dissolved in 50 milliliters of hot alcohol and 10 milliliters of water added. On cooling, an oil separated, taking with it all the color in the solution, after which crystallization yielded 2.2 grams of material. An additional 0.32 gram of crystals was obtained by crystallizing the oil from alcohol, the total yield being 2.52 grams (51 per cent of the theoretical), M. P. 105–110 degrees centigrade. After three recrystallizations, the melting point was constant at 111–112 degrees centigrade (corr.).

Other suitable thioesters which may be employed as starting materials in the method of the present invention are given in the table.

TABLE—ESTERS OF STEROID ACIDS

| Compound | M. P., °C.[1] | Rotation[2] (alpha)$_D$ | Molecular Formula | Carbon Calcd. | Carbon Found | Hydrogen Calcd. | Hydrogen Found | Sulfur Calcd. | Sulfur Found |
|---|---|---|---|---|---|---|---|---|---|
| ethyl 3-beta-hydroxy-(delta 5)-thiocholenate | 108.5–109.5 | −38.5 | $C_{26}H_{42}O_2S$ | 74.59 | 74.64 | 10.00 | 10.07 | 7.66 | 7.79 |
| ethyl 3-beta-formoxy-(delta 5)-thiocholenate | 81–82 | −47.5 | $C_{27}H_{42}O_3S$ | 72.60 | 72.07 | 9.48 | 9.61 | 7.18 | 7.01 |
| ethyl 3-beta-acetoxy-(delta 5)-thiocholenate | 101.5–103.5 | −40.9 | $C_{28}H_{44}O_3S$ | 72.99 | 72.92 | 9.63 | 9.69 | 6.98 | 7.36 |
| isopropyl 3-beta-acetoxy-(delta 5)-thiocholenate | 131–133 | −40.4 | $C_{29}H_{48}O_3S$ | 73.37 | 73.39 | 9.77 | 9.55 | 6.75 | 6.81 |
| tert-butyl 3-beta-acetoxy-(delta 5)-thiocholenate | 169.5–171 | −39.8 | $C_{30}H_{48}O_3S$ | 73.72 | 74.07 | 9.90 | 9.96 | 6.56 | 6.71 |
| n-hexyl-3-beta-acetoxy-(delta 5)-thiocholenate | 77.5–79.5 | −35.4 | $C_{32}H_{52}O_3S$ | 74.37 | 74.70 | 10.14 | 10.00 | 6.20 | 6.60 |
| ethyl-3-chloro-(delta 5)-thiocholenate | 103.5–105 | −30.4 | $C_{26}H_{41}OSCl$ | 71.44 | 71.51 | 9.46 | 9.58 | 8.11 | [4] 8.75 |
| ethyl-3-beta-acetoxy-5-chloro-nor-thiocholenate | 165–168 | | $C_{28}H_{43}O_3SCl$ | | | | | 6.45 | 6.32 |
| ethyl 3-beta-acetoxy-(delta 5)-bisnor-thiocholenate | 132–133 | −38.0 | $C_{26}H_{40}O_3S$ | 72.18 | 72.50 | 9.32 | 9.13 | 7.41 | 7.44 |
| ethyl 3-alpha,12-diformoxy[3] thiocholanate | 111–112 | +92.1 | $C_{28}H_{44}O_5S$ | 68.25 | 68.39 | 9.00 | 8.89 | 6.51 | 6.51 |
| ethyl 3-alpha-formoxy thiocholanate | 81–82 | +41.3 | $C_{27}H_{44}O_3S$ | 72.27 | 72.53 | 9.89 | 9.74 | 7.14 | 7.23 |
| ethyl 3-alpha,12-diacetoxy-nor-thiocholanate | 91–91.5 | +96.0 | $C_{29}H_{46}O_5S$ | 68.76 | 69.07 | 9.15 | 9.47 | 6.33 | 6.37 |
| benzyl 3-alpha,12-alpha-diacetoxy-nor-thiocholanate | 154–156 | +95.5 | $C_{34}H_{48}O_5S$ | 71.79 | 71.56 | 8.51 | 8.79 | 5.64 | 5.66 |
| phenyl 3-alpha,12-alpha-diacetoxy-nor-thiocholanate | 146–147 | +99.7 | $C_{33}H_{46}O_5S$ | 71.44 | 71.30 | 8.36 | 8.04 | 5.78 | 5.64 |
| phenyl 3-beta-acetoxy-(delta 5)-thiocholenate | 128.5–130 | | | 75.40 | 75.11 | 8.90 | 8.59 | 6.29 | 6.89 |
| benzyl 3-beta-acetoxy-(delta 5)thiocholenate | 85–86.5 | | | 75.67 | 75.77 | 9.05 | 8.72 | | |
| ethyl 3-alpha,7-alpha, 12-alpha-triformoxythiocholanate | c. 128 | | | 64.77 | 65.78 | 8.44 | 8.07 | | |
| ethyl 3-alpha-hydroxy-12-alpha-acetoxythiocholanate | | | | | | 9.54 | 9.34 | | |
| ethyl 3-methoxy-(delta 5)-bisnor-thiocholenate | 94–96 | | | | | | | | |
| ethyl 3-benzoyloxy-(delta 5)-thiocholenate | 178–182 | | | | | | | | |
| ethyl thiodehydrocholate | 244–246.5 | | | | | | | | |

[1] All M. P.'s corrected.
[2] Rotations taken at approximately 25° C. in chloroform with a 1 cm. tube.
[3] Desoxycholic acid is formulated as 3-alpha-12-alpha, according to the latest evidence (Ann. Rev. Biochem. 15, 162 (1946)).
[4] Chlorine analysis.

The presence or absence of substituents in the pregnane nucleus of the thioester, such as hydroxy, ester or ether groups convertible to hydroxy with the aid of hydrolysis, halogen, double bonds, and the like, is immaterial to the present process, as it has been found that sensitive groups commonly present in the steroid nucleus are stable under the conditions of reaction. The stability, particularly that of a nuclear double bond, is of considerable value, as any double bonds do not require protection during preparation of the aldehyde from the thioester.

Desulfurization agents which may be employed to prepare steroid aldehydes from thioesters include modified Raney nickel catalysts, modified Raney iron catalysts, and other modified catalysts of this type. Preparation of Raney-type catalysts is known to the art (R. Paul and G. Hilley, Comp. rendus, 206, 608 (1938); U. S. Patent 2,366,311 to F. W. Breuer; Homer Adkins, "Reactions of Hydrogen with Organic Compounds over Copper-Chromium Oxide and Nickel Catalysts," University of Wisconsin Press, Madison, 1937 (p. 20)). If such normally active Raney-type catalysts are employed, however, the desired aldehydes are not produced. It has now been found that, upon proper modification, a Raney-type catalyst is an effective agent for splitting C—S bonds and replacing them with C—H bonds, and thus suitable for use in the conversion of steroid thioesters to steroid aldehydes in high yields. Such modification may be accomplished by allowing the Raney-type catalyst to age considerably, or by treating a normally active Raney-type catalyst with a hydrogen acceptor, e. g., an ethylene, or a carbonyl compound such as a ketone or an aldehyde. This treatment may be advantageously carried out by refluxing the normally active catalyst with the hydrogen acceptor to modify the catalyst sufficiently, usually for a period of an hour or more, depending upon initial catalyst activity, ratios of catalyst to hydrogen acceptor, et cetera. The modified Raney-type compositions will desulfurize, that is convert a C—S bond to a C—H bond, but do not reduce carbonyl groups or ethylenic linkages in the compounds treated or products produced. This is because the modification, i. e., reaction with a hydrogen acceptor, apparently removes adsorbed hydrogen from the surfaces of the Raney-type composition, or, for some other unknown reason, eliminates the reducing activity of the normally active Raney-type catalysts. Acetone has been found especially suitable for modification of the Raney-type catalyst, which, for purposes of convenience, is usually Raney-nickel. Any other suitable hydrogen acceptor or Raney-type catalyst may also be employed, however.

The desulfurization is conducted conveniently by mixing together the modified Raney-type catalyst and a selected steroid thioester. The reactants are maintained in contact for a period of time sufficient to produce desulfurization of the starting thioester, with production of the corresponding side-chain-length aldehyde. Agitation is desirable for intimate contact of reactants, and heating is likewise advantageous in some instances. The temperature is ordinarily maintained between about 15 degrees centigrade and 100 degrees centigrade. Common organic solvents, such as acetone, alcohol, ether, and the like, or any organic solvent in which the thioester is soluble and stable, may be employed. Likewise, water, or mixtures of water and an organic solvent, are suitable media, providing efficient contact of reactants is maintained. Product separation is accomplished by removing the desulfurizing agent and working up the organic product according to conventional procedure.

The preparation of the steroid aldehyde from a steroid thioester may be illustrated by the following sequence wherein a simple unsubstituted steroid nucleus is shown:

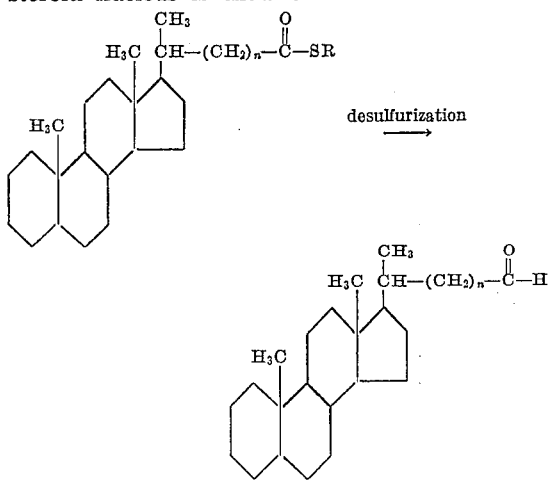

If desired, characterization of the aldehyde may be readily accomplished by formation of an aldehyde derivative such as the oxime, semicarbazone, or other well known aldehyde derivatives.

The preparation of an aldehyde by desulfurization of the thioester is described in detail in the following illustrative examples, which, however, are not to be construed as limiting.

*Example 3.—3,12-diacetoxy-nor-cholanal-23*

A suspension of 10 grams of Raney nickel in 30 milliliters of acetone was heated under reflux for two hours, whereafter one gram of ethyl 3,12-diacetoxy-nor-thiocholanate in 20 milliliters of acetone, followed by 20 milliliters of water, was added thereto. The mixture was heated under reflux for 70 minutes, then cooled, filtered to remove Raney nickel, and concentrated in vacuo. The residue was extracted with ether, the ether solution washed with dilute acid, dilute alkali, and water, after which solvents were removed. The residue was treated with semicarbazide acetate to give 0.71 gram of the semicarbazone of 3,12-diacetoxy-nor-cholanal-23, M. P. 210–226 degrees centigrade. A sample recrystallized several times melted at 229–230.5 degrees centigrade.

*Example 4.—3-formal-lithocholanal-24*

One gram of ethyl 3-formyl-thiolithocholate was reduced to the aldehyde and isolated as the semicarbazone as described above. The yield of crude semicarbazone, M. P. 182–189 degrees centigrade, was 0.96 gram. After two crystallizations from toluene and methanol, 0.32 gram, melting at 215–216.5 degrees centigrade, remained.

Anal. Calcd.: C, 70.07; H, 9.73; N, 9.43
Found: C, 70.37; H, 9.76; N, 9.60

The sample melting at 215–216 degrees centigrade was suspended in ether, washed with water, and recrystallized to give a sample melting at 224–227 degrees.

*Example 5. — 3-beta-acetoxy-(delta 5)-bisnor-cholenaldehyde*

A suspension of 5 grams of Raney nickel in 15 milliliters of acetone was heated under reflux for 2 hours, then 0.50 gram of ethyl 3-beta-acetoxy-(delta 5)-bisnor-thiocholenate in 10 milliliters of acetone and 8 milliliters of water was added. The mixture was refluxed for two hours, allowed to cool slightly, and filtered to remove Raney nickel. The nickel was washed with methanol. Crystals began separating in the filtrate, which was placed in the refrigerator for three days; the crystals were then separated by filtration. The filtrate was diluted with water, giving 197 milligrams of amorphous powder; M. P. 88–90 degrees centigrade. The amorphous powder (197 milligrams), 0.20 gram of semicarbazide hydrochloride, 0.3 gram of sodium acetate, 8 milliliters of absolute ethanol, and 2.5 milliliters of water were heated under reflux for 2 hours, the reaction mixture cooled and diluted with water to give 246 milligrams of crystals; M. P. 190–200 degrees centigrade. After several crystallizations from 95 per cent alcohol and water, the melting point rose to 215–218 degrees centigrade.

Anal. Calcd. for $C_{25}H_{38}O_3N_3$: N, 9.805
Found: N, 9.70.

The powder, M. P. 88–90 degrees centigrade, was 3-beta-acetoxy-(delta 5)-bisnor-cholenaldehyde, which upon recrystallization melted at 101–108 degrees centigrade.

Reduction of the aldehyde to an alcohol of the formula:

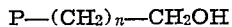

wherein P and $n$ have the values previously assigned, may be carried out with any suitable Raney-type hydrogenation catalyst. Among the Raney-type catalysts which may be mentioned are Raney nickel and Raney iron. Superactivated catalysts are available, and employment of such catalysts of enhanced activity is sometimes advantageous. An organic solvent, such as ether, alcohol, benzene, toluene, or ethyl acetate are suitable. The reaction is conducted by admixing the reactants in the presence of a solvent, and temperatures between about zero and about 120 degrees centigrade are preferred. The product may be removed from the reaction vessel after completion of the reaction, separated from Raney-type catalyst, and then worked up for purification and separation purposes as desired, usually by direct crystallization from the solvent employed.

The following examples are given to illustrate the preparation of the primary alcohols from aldehydes, but are in no way to be construed as limiting.

*Example 6.—Reduction of 3-beta-acetoxy-bisnor-(delta 5)-cholenaldehyde*

3 - beta - acetoxy-(delta 5)-bisnor-cholenaldehyde (prepared from ethyl 3-beta-acetoxy-(delta 5)-bisnor-thiocholenate by desulfurization with modified Raney nickel) was used for preparation of 3-beta-acetoxy-22-hydroxy-(delta 5) - bisnor-cholene. The sample used melted at 90–100 degrees centigrade, and contained at least 61 per cent of aldehyde as shown by assay with dinitrophenylhydrazine.

A suspension of 222.6 milligrams of the crude aldehyde in 18 milliliters of absolute alcohol was stirred with 2.0 grams of Wisconsin Raney nickel at room temperature for 30 minutes, the nickel was removed by filtration and washed with three 5-milliliter portions of hot acetone. The filtrate and washings were combined and boiled down to about 20 milliliters, then diluted while hot with 14 milliliters of water. The clear solution gave needle-shaped crystals on cooling. The yield was 185.7 milligrams of 3-beta-acetoxy-22-hydroxy-(delta 5)-bisnor-cholene; M. P., 152 degrees centigrade.

*Example 7.—Reduction of 3,12-diacetoxy-nor-cholanal-23*

Crude ethyl 3,12-diacetoxy-nor-cholanal-23 (prepared by desulfurization of ethyl 3-alpha-12- alpha-diacetoxy-nor-thiocholanate with modified Raney nickel) is reduced according to the procedure of Example 6 to give an excellent yield of 3-alpha-12-alpha-diacetoxy-23-hydroxy - nor-cholane, M. P. 154–155 degrees centigrade.

*Example 8.—Reduction of 3-beta-acetoxy-(delta 5)-cholenal-24*

The aldehyde (prepared by desulfurization of ethyl 3-beta-acetoxy-(delta 5) - thiocholenate with modified Raney nickel) is reduced in the same manner as given for Example 6 to produce 3-beta-acetoxy-24- hydroxy - (delta 5) - cholene, M. P. 143.5–146 degrees centigrade.

An advantage of the process as previously outlined is the possibility of reducing a steroid aldehyde, having the selected side-chain length, to a primary alcohol of corresponding side-chain length, without converting nuclear acyloxy groups to hydroxy groups. For example, starting with a 3,12-diacyloxy pregnane derivative of designated side-chain length, the reduction converts the aldehyde group to a primary alcohol group without affecting the acyloxy group. However, when one or both acyloxy groups are formoxy, prolongation of the reaction period may be employed, if desired, to obtain conversion of the formoxy group at position 3 to a hydroxy group. The conversion of the 3-formoxy group to hydroxy may be caused to occur by extending the reaction period or by employing more strenuous reaction conditions. The conversion takes place under such conditions, regardless of the acyloxy group at the 12 carbon atom, which appears to be more stable. This is an important observation, allowing variation of the nuclear acyloxy groups, as the 3-hydroxyl may be acylated with a different group to produce a compound with unlike acyloxy groups in the 3 and 12 positions.

Representative alcohols which may be prepared from the corresponding aldehydes by reduction with Raney nickel are as follows:

| Alcohol | M. P., °C. |
|---|---|
| 3-alpha-formoxy-24-hydroxycholane | 81.5–83 |
| 3-alpha-24-dihydroxy-12-formoxycholane | 185–186.5 |
| 3-alpha-12-alpha-diacetoxy-23-hydroxy-nor-cholane | 154–155 |
| 3-beta-acetoxy-24-hydroxy-(delta 5)-cholene | 143–146 |
| 3-beta-24-dihydroxy-(delta 5)-cholene | 196–199 |
| 3-benzoxy-24-hydroxy-(delta 5)-cholene | 182–184 |
| 3-alpha-23-dihydroxy-12-alpha-acetoxy-nor-cholane | 172–174 |
| 3-alpha-12-alpha-diacetoxy-23-hydroxy-nor-cholene | 148.5–151 |
| 3-beta-acetoxy-22-hydroxy-(delta 5)-bisnor-cholene | 152–153.5 |

The novel compounds of the present invention have the formula

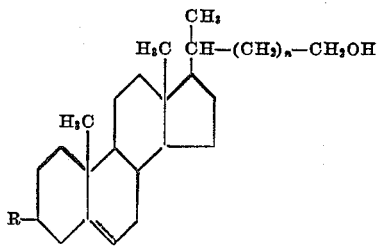

wherein $n$ is selected from zero, one, or two; R is acyloxy; and the 5-6 bond is selected from saturated and unsaturated bonds. These compounds may be prepared by the method described previously, i. e., from the corresponding aldehydes.

The acyloxy group may be varied widely, and may be, for example, propionoxy, butyroxy, benzoxy, and the like, depending upon the starting thioester or aldehyde.

Other representative compounds which may be prepared within the scope of the present invention are 3-butyroxy-24-hydroxy-cholane,
3-formoxy-23-hydroxy-nor-cholane,
3-propionoxy-22-hydroxy-bisnor-cholane, and
3-acetoxy-23-hydroxy-(delta 5)-nor-cholene.

Various modifications may be made in the present invention without departing from the spirit or scope thereof, and it is to be understood that we limit ourselves only as defined in the appended claims.

We claim:

1. The process which includes: converting a compound of the formula:

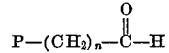

wherein P represents a nucleus selected from the group consisting of pregnane, pregnene, and pregnadiene nuclei, which is attached to the sidechain in the 20 position; and $n$ is selected from zero, one, and two; to a compound of the formula:

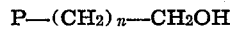

wherein P and $n$ have the previously assigned values, by reacting the steroid aldehyde with a Raney-type catalyst.

2. The process of claim 1, wherein the conversion is with Raney nickel in the presence of an organic solvent.

3. The process which includes: transforming a steroid thioester into a steroid aldehyde and converting the aldehyde into a primary alcohol, by reacting the aldehyde with a Raney-type catalyst.

4. The process which includes: mixing a compound of the formula

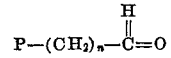

wherein P represents a nucleus selected from the group consisting of pregnane, pregnene, and pregnadiene nuclei, said nucleus having the sidechain attached in the 20 position; and $n$ is selected from zero, one, and two; with a Raney-type catalyst at a temperature between about zero and 120 degrees centigrade; and separating a steroid alcohol of the formula:

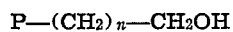

wherein P and $n$ have the values previously assigned, from the reaction product.

5. The process of claim 4, wherein the Raney-type composition is Raney nickel.

6. The process of claim 4, wherein the reaction is conducted with Raney nickel in the presence of an organic solvent.

7. The process of claim 4, wherein the starting aldehyde is a bisnor-(delta 5)-cholenal-22.

8. The process of claim 4, wherein the starting aldehyde is a nor-cholanal-23.

9. The process of claim 4, wherein the starting aldehyde is a (delta 5)-cholenal-24.

ROBERT H. LEVIN.
A. VERN McINTOSH, Jr.
GEORGE B. SPERO.

REFERENCES CITED

The following references are of record in the file of this patent:

UNITED STATES PATENTS

| Number | Name | Date |
|---|---|---|
| 2,259,698 | Johannessohn | Oct. 21, 1941 |
| 2,312,484 | Reichstein | Mar. 2, 1943 |